United States Patent
Arms et al.

(10) Patent No.: US 7,860,680 B2
(45) Date of Patent: Dec. 28, 2010

(54) ROBOTIC SYSTEM FOR POWERING AND INTERROGATING SENSORS

(75) Inventors: Steven Willard Arms, Williston, VT (US); Christopher Pruyn Townsend, Shelburne, VT (US); Michael John Hamel, Williston, VT (US)

(73) Assignee: Microstrain, Inc., Williston, VT (US)

( * ) Notice: Subject to any disclaimer, the term of this patent is extended or adjusted under 35 U.S.C. 154(b) by 2156 days.

(21) Appl. No.: 10/379,224

(22) Filed: Mar. 5, 2003

(65) Prior Publication Data
US 2003/0234730 A1 Dec. 25, 2003

Related U.S. Application Data

(60) Provisional application No. 60/362,432, filed on Mar. 7, 2002.

(51) Int. Cl.
*G01D 1/00* (2006.01)
(52) U.S. Cl. .................................. 702/127
(58) Field of Classification Search .............. 701/23; 702/127
See application file for complete search history.

(56) References Cited

U.S. PATENT DOCUMENTS

| | | | |
|---|---|---|---|
| 5,551,525 A | 9/1996 | Pack | |
| 5,668,325 A * | 9/1997 | Hart et al. | ............... 73/818 |
| 6,433,629 B2 | 8/2002 | Hamel | |
| 6,487,650 B1 * | 11/2002 | Dennison | ............... 711/217 |
| 6,529,127 B2 | 3/2003 | Townsend et al. | |
| 6,622,567 B1 | 9/2003 | Hamel | |
| 6,864,755 B2 * | 3/2005 | Moore | ............... 331/166 |
| 7,081,693 B2 | 7/2006 | Hamel | |
| 7,143,004 B2 | 11/2006 | Townsend | |
| 2002/0024450 A1 | 2/2002 | Townsend | |
| 2003/0158699 A1 | 8/2003 | Townsend | |

OTHER PUBLICATIONS

Horowitz and Hill, "The Art of Electronics", Cambridge University Press, p. 44-45.*
Huston, et al, "Wireless Inspection of Structures Aided by Robots," Proc. SPIE vol. 4337, p. 147-154, Health Monitoring and Management of Civil Infrastructure Systems, Steven B. Chase; A Emin Aktan; Eds., Aug. 2001.
Huston, et al, "Electromagnetic Interrogation of Structural Health," Proc. International Conference on Health Monitoring of Civil Infrastructure Systems, pp. 47-55, Yangtze River, China, Oct. 1999.
"Wireless Web Sensor Networks," product literature published Jun. 2001, available from MicroStrain Inc., Suite 4, 310 Hurricane Lane, Williston, VT 05495.
"Robots Team with New Wireless Tags for Top Security," The Instrumentation, Systems and Automation Society, Dec. 14, 2000, http://www.isa.org/journals/mc/news/1,1160,1431,00.html.
Schrope, "Bridge Checkup," MIT Enterprise Technology Review, Jun. 26, 2001.

(Continued)

*Primary Examiner*—Drew A Dunn
*Assistant Examiner*—Stephen J Cherry
(74) *Attorney, Agent, or Firm*—James Marc Leas

(57) ABSTRACT

A mobile system powers, charges, and communicates with separate devices, such as sensors and actuators. The mobile system includes an unmanned vehicle for approaching and wirelessly electromagnetically powering the separate device.

68 Claims, 11 Drawing Sheets

OTHER PUBLICATIONS

Huston, "Adaptive Sensor and Sensor Networks for Structural Health Monitoring," Proc. SPIE Vol. 4512, p. 203-211, Complex Adaptive Structures, William B. Spillman; Ed. Oct. 2001.

"Scalable Wireless Web Sensor Network Users Manual," 2001, product literature available from MicroStrain, Inc., Suite 4, 310 Hurricane Lane, Williston, VT 05495.

Esser et al, "Wireless Inductive Robotic Inspection of Structures," pp. 209-213 in "Robotics and Applications," 2000, M.H. Hamza, Proceedings of the IASTED International Conference, Honolulu, Hawaii, 2000.

\* cited by examiner

ROBOTIC SYSTEM FOR POWERING AND INTERROGATING SENSORS

RELATED APPLICATIONS

This patent application is related to the following U.S. patent applications:

Applicant claims the benefit of provisional patent application 60/362,432, filed Mar. 7, 2002, incorporated herein by reference;

Ser. No. 09/731,066, filed Dec. 6, 2000, incorporated herein by reference

Ser. No. 09/801,230, filed Mar. 7, 2001, incorporated herein by reference;

Ser. No. 09/768,858, filed Jan. 24, 2001, incorporated herein by reference;

Ser. No. 09/114,106, filed Jul. 11, 1998, incorporated herein by reference;

Ser. No. 09/457,493, filed Dec. 8, 1999, incorporated herein by reference;

provisional patent application 60/362,432, filed Mar. 7, 2002, incorporated herein by reference;

provisional patent application 60/443,120, filed Jan. 28, 2003, incorporated herein by reference; and non-provisional patent application Ser. No. 10/379,223, filed the same day as this application, incorporated herein by reference.

FIELD OF THE INVENTION

This invention generally relates to power management of sensors. More particularly, it relates to an improved system for powering and communicating with sensors. Even more particularly, it relates to an energy harvesting system for powering and communicating with sensors.

BACKGROUND OF THE INVENTION

Sensors are being developed for use in roads, bridges, dams, buildings, towers, and vehicles that may provide many different types of information, including displacement, strain, speed, acceleration, temperature, pressure, and force. Providing power to the sensors and communicating data from the sensors has been difficult. The present invention provides a way to more efficiently provide power for sensors and to communicate with sensors.

Inspection of civil structures are very important for public safety. Litigation costs due to structural failure not only hurts the department held responsible for the failure, but the litigation takes money away from other projects, which in turn, increases public risk by reducing monies available for future maintenance and inspections. We propose to develop an autonomous robotic sensor inspection system capable of remote powering and data collection from a network of embedded sensing nodes, and providing remote data access via the internet. The system will utilize existing microminiature, multichannel, wireless, programmable Addressable Sensing Modules (ASM's) to sample data from a variety of sensors. These inductively powered nodes will not require batteries or interconnecting lead wires, which greatly enhances their reliability and lowers costs.

Networks of sensing nodes can be embedded, interrogated, and remotely accessed in applications where visual inspection by people is not practical due to: physical space constraints, remote geographic locations, high inspection costs, and high risks involved for those performing the inspections. The sensors can indicate the need for repair, replacement, or reinforcement, which will reduce the risks of catastrophic failures and would be useful after natural disasters. Sensors of peak displacement, peak strain, corrosion, temperature, inclination, and other microelectromechanical sensors (MEMS), are now capable of embeddment in structures, and are compatible with our ASM's. The availability of critical structural health data on the internet would greatly assist highway engineers and scientists, to improve their working database on these structures, which will improve our understanding of the safety of civil structures and their requisite maintenance.

In the majority of civil structures, there is little data to help an engineer model the behavior of a structure before it is built or after rehabilitation. This leaves an engineer to rely on past experience to determine what type of repair to apply without truly knowing its affect on the physical strength of the structure. Physical measurements and on-site examinations are performed to assess structural integrity. Typically, maintenance and repairs are not performed until serious structural damage can be seen. In some cases, such as marine structures, damage occurs out of visual site where only specialized sensors can detect distress. Natural disasters such as floods, earthquakes, hurricanes, ice storms, and tornadoes, as well as everyday use, collisions, deicing salts, drainage, and corrosion compromise the safety of civil structures.

The soundness of on-site evaluations depends upon the people performing the inspection. The accuracy of the inspection depends on many factors: how thorough is the inspector, their ability to detect unsafe conditions, and the resources available-personnel, financial, equipment, and workload. Civil structures are large and can be located in unsafe and harsh environments. Traffic flow, structure height, the grade around the structure, underwater (pollution), and confined spaces (air poisoning) are a few obstacles inspectors have to overcome. Water pollution has made inspectors sick while checking bridge piers and abutments for scour. Seasonal thawing can increase river flow making bridge inspection dangerous. Steep embankments increase the risk of vehicle overturn. Having a way to interrogate embedded sensing nodes with multiple sensing elements (strain, temperature, vibration, depth, etc.) and inspect structures remotely would save time, equipment costs, personnel costs, and lower health risks to inspectors and the people using the structure.

Environmental influences such as scour, wind, waves, collisions, and corrosion weaken bridge integrity. Scour occurs when (1) sediment is carried away around bridge piers or abutments (2) sediment is removed from the bottom and sides of a river due to the bridge creating a narrower than natural channel for the river to flow through (3) and by everyday river flow carrying away sediment from the river bottom. Floods are the main cause of scour, eroding the ground that supports the bridge. Between the years 1961 and 1976, 46 of 96 major bridge failures were due to scour near piers. In 1987 the Interstate Highway bridge over Schoharie Creek in New York State collapsed killing 10 people, a total of 17 bridges were lost in New York that year due to scour. In 1989 a bridge over the Hatchie River in Covington, Tenn. failed due to scour killing 8 people.

Scour is measured using a number of techniques, such as: fathometers, fixed- and swept-frequency continuous seismic reflection profiling, and ground-penetrating radar. In each case an inspector has to be present to operate the equipment. The ability to monitor scour, as well as peak strain, during a flood using a remote interrogation process would increase safety, give real-time feedback, and potentially save lives.

Railroads provide another opportunity for remote monitoring of embedded sensors. Aug. 10, 1997 in Kingman, Ariz. an Amtrak passenger train derailed as it traveled on a bridge spanning a river. A storm suddenly moved in dumping 1.76" of rain causing a flash flood. Inspectors had inspected the bridge not more than three hours before the accident, warning sensors located on the bridge failed to stop or warn the train of damage. Remote interrogation hardware could be used to test track continuity as well as measure truss integrity.

Sensors can be embedded in or placed on structures to record physical measurements. Buildings, such as the Millikan Library at Caltech and Factor Building at UCLA as well as dams (Winooski dam in Winooski, Vt.) have been gauged with fiber optic sensors to monitor performance. All of the sensors used rely on power being constantly supplied to the sensor to operate and cables (with connectors) must be embedded in the structure for power and communication. This works well when the structure is easily accessible and power is always available, or, if battery powered, the batteries can be replaced easily. But power is not always available at the time when readings are needed most and batteries can only be embedded if they can be recharged. If the structure is located in a remote area, data may not be accessible when needed. Embedding cable is costly and time consuming during manufacture. Cabling also elevates the risk of failure during everyday operation and disasters.

Presently there is neither a means nor a system that can remotely interrogate an array of independent sensing nodes located throughout a structure. "The Robotic Inspector" (ROBIN, U.S. Pat. No. 5,551,525) was developed at the Intelligent Robotics Lab at Vanderbilt University. ROBIN was developed to inspect man-made structures. Advantages of ROBIN are that it is highly mobile and has versatile fixtures. However, ROBIN carries specific sensors in its limited payload area and is also restricted by a power cord.

Visual/Inspection Technologies, Inc. developed a product called SPOT that uses a pan & tilt zoom camera for pipe inspection. Although SPOT can travel into areas that people cannot, it requires an on-site person for operation, it is only equipped with a camera, it can weigh up to 120 lbs., and SPOT is specific to pipe applications.

NASA has developed a robot to search Antarctica for meteorites and rocks. The robot "Amadeus Nomad" can travel in sever weather conditions which constantly impede human travel. Amadeus Nomad requires minimal human assistance but uses onboard sensors for inspection.

Insects, although possessed of severely limited computational abilities (very small brains) can deal effectively with their environment. An insect's ability to navigate, respond to hazards, and achieve its goals (finding food and a mate) puts any robot to shame. Behavior Control (developed by Prof. Rodney Brooks at MIT in 1986) attempts to encapsulate the computational efficiencies that insects and other organisms use to achieve their impressive results. Behavior Control has proven an effective robot programming strategy for handling dynamic and/or poorly modeled environments. Behavior Control's sensor based strategy produces robots that respond quickly to changing conditions, react robustly to unexpected situations, and degrade gracefully in the presence of sensor faults. The most visible recent success of the Behavior Control methodology was Sojourner, the Mars rover. Sojourner was the culmination of several years of development of Behavior Control robots (Rocky I through Rocky IV) at NASA's Jet Propulsion Laboratory, JPL.

There is a need for robust, insect-like, autonomous structural inspection systems which can be used with easily deployed or embedded sensing nodes; and for data collected from these structures to be readily over the Internet. None of the available systems provide power to the sensors and communicate data from the sensors as effectively as possible. Thus, a better system for powering sensors and storage devices, and for transmitting data gathered by sensors is needed, and this solution is provided by the following invention.

SUMMARY OF THE INVENTION

It is therefore an object of the present invention to provide an improved mobile system comprising an unmanned vehicle for approaching and wirelessly electromagnetically powering a separate device;

It is a further object of the present invention to provide improved use of power by the separate device;

It is a further object of the present invention to provide for charging the separate device by the unmanned vehicle;

It is a further object of the present invention to provide a switched reactance modulation circuit for communicating data from the separate device;

It is a further object of the present invention to provide that each of the separate devices of a network of separate devices has a unique identification code;

It is a feature of the present invention that the separate device has a data logging unit and a communications circuit, the data logging unit for storing information from a sensor and the communications circuit for communicating data stored in the data logging unit;

It is a feature of the present invention that a charging circuit on the unmanned vehicle is capable of charging or recharging a battery or a capacitor on the separate device without physically contacting the separate device; and It is an advantage of the present invention that substantially greater energy efficiency is obtained by providing a unique identification code, switched reactance, and non-contacting powering and charging.

These and other objects, features, and advantages of the invention are accomplished by a sensing system, comprising an unmanned vehicle and a wireless sensing module, said unmanned vehicle for approaching and wirelessly electromagnetically powering said wireless sensing module, wherein said wireless sensing module comprises a sensor, a data logging unit, and a communications circuit, said data logging unit for storing information from said sensor, said communications circuit for communicating data stored in said data logging unit.

Another aspect of the invention is accomplished by a mobile system for charging a separate device, comprising an unmanned vehicle for approaching and wirelessly electromagnetically powering the separate device, wherein said unmanned vehicle further comprises a charging circuit, wherein said charging circuit is capable of charging or recharging a battery or a capacitor on the separate device without physically contacting the separate device.

Another aspect of the invention is accomplished by a mobile system for powering a separate device, comprising an unmanned vehicle for approaching and wirelessly electromagnetically powering the separate device.

Another aspect of the invention is accomplished by a mobile system comprising an unmanned vehicle for approaching and wirelessly electromagnetically powering a separate device in which the unmanned vehicle has a processor for directing movement of the unmanned vehicle toward the separate device.

Another aspect of the invention is accomplished by a mobile system for powering a separate device, comprising an unmanned vehicle for approaching and wirelessly electromagnetically powering a separate device, wherein said separate device contains a switched reactance modulation circuit for communicating data.

Another aspect of the invention is accomplished by a mobile system for reading a separate device, comprising an unmanned vehicle and a plurality of separate devices, said unmanned vehicle for approaching and wirelessly electromagnetically reading said plurality of separate devices, wherein each of said separate devices has a unique identification code.

BRIEF DESCRIPTION OF THE DRAWINGS

The foregoing and other objects, features, and advantages of the invention will be apparent from the following detailed description of the invention, as illustrated in the accompanying drawings, in which.

DETAILED DESCRIPTION OF THE INVENTION

Figure 7:
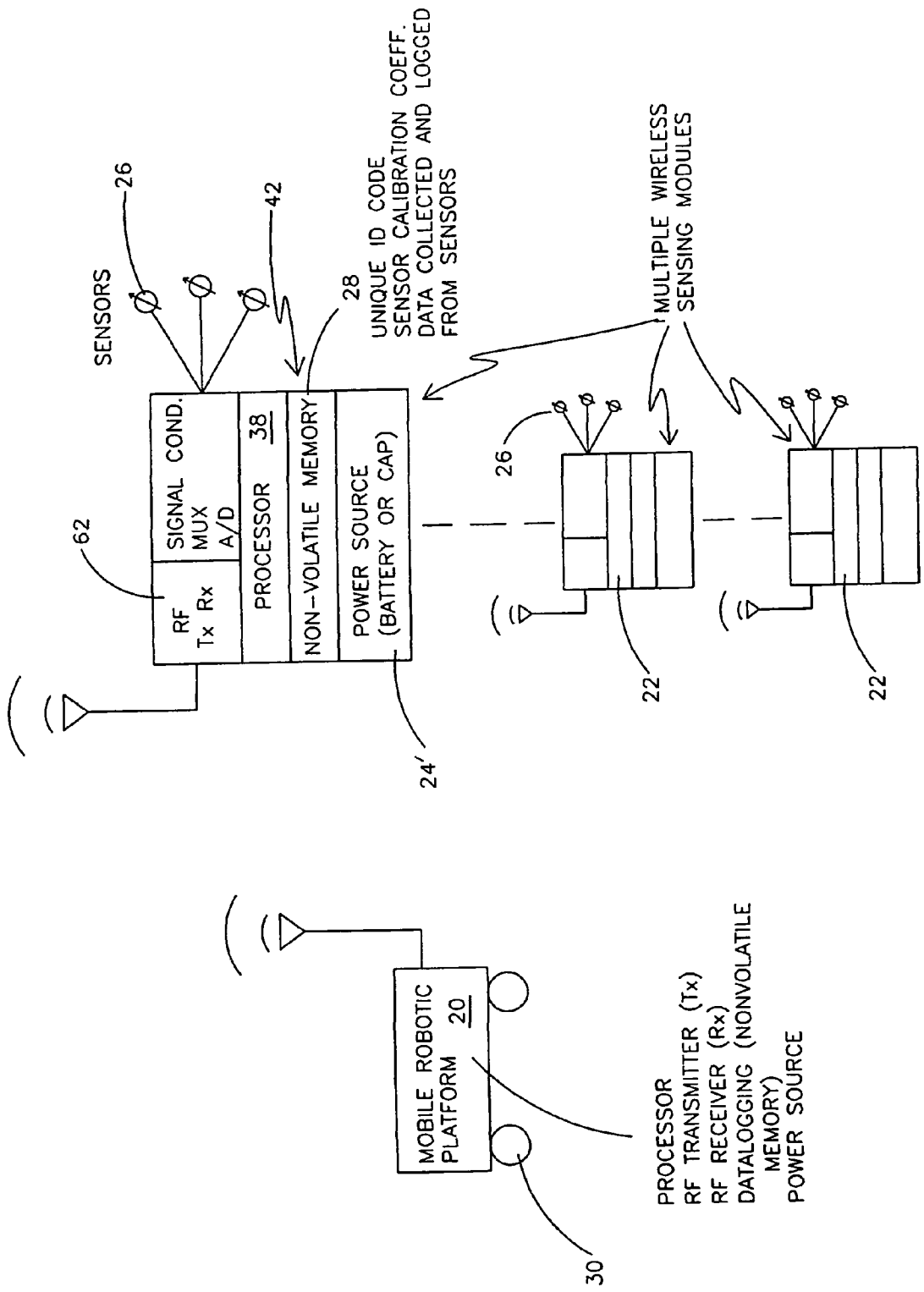
FIG. 7 is a block diagram similar to that of FIG. 6 in which power supplies are charged once or are recharged from the environment rather than from the unmanned vehicle.

The present inventors recognized that unmanned vehicle or robot 20 could approach and wirelessly electromagnetically power a separate device, such as wireless sensing module 22, as shown in FIG. 7, or to an actuator (not shown). Unmanned vehicle 20 could wirelessly provide the power needed by wireless sensing module 22 for operating wireless sensing module 22 while unmanned vehicle 20 is nearby. The present inventors also recognized that unmanned vehicle 20 could also periodically wirelessly provide the power for charging or recharging batteries or capacitors 24 included with wireless sensing module 22 so wireless sensing module 22 could operate and transmit while unmanned vehicle 20 is far away. The present inventors also recognized that unmanned vehicle 22 could also wirelessly receive data from sensor 26 as it is collected by sensor 26. Alternatively, unmanned vehicle 20 could collect data that was collected over time and stored in data logging system 28 included with wireless sensing module 22. The present inventors recognized that the communication between wireless sensing module 22 and unmanned vehicle 20 can be by radio or by switched reactance modulation.

Unmanned vehicle 20 can have wheels 30 for rolling about on a structure (not shown). Wheels 30 can be magnetic so unmanned vehicle 20 sticks to iron containing structures, such as bridges and can crawl around on the structure. It can also have wings for flying. It can be able to recharge while in flight. It can have fins for traveling through water. Other forms of locomotion are also possible. It can be able to recharge batteries 24, interrogate wireless sensing modules 22, or turn on or off actuators (not shown) in inaccessible places, such as underwater or in difficult to reach structures.

A data logging transceiver is described in copending patent application Ser. No. 09/731,066, ("the '066 application") incorporated herein by reference. The '066 application was filed Dec. 6, 2000. The '066 application describes a remotely activated wireless high speed data logging system that receives instructions and transmits data accumulated over time and stored in memory. A wireless high speed data logging system with a transceiver, as described in the '066 application can be used in the present invention to store data accumulated from the sensor and can then transmit the data. The data may be transmitted directly to a base station. It can also be transmitted to the unmanned vehicle, such as a drone or robot, when the unmanned vehicle is nearby.

Figure 4:
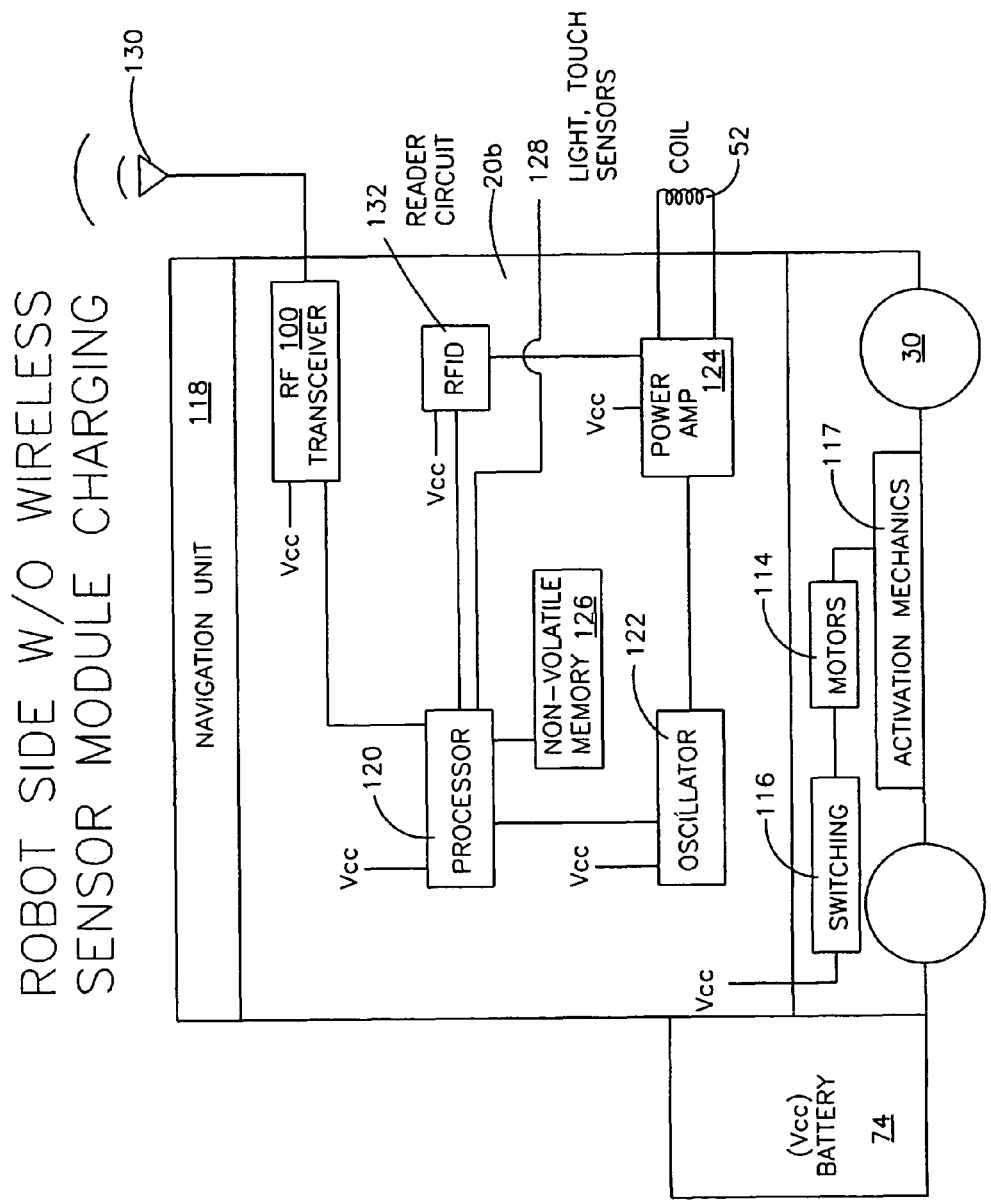
FIG. 4 is a block diagram of an unmanned vehicle having a circuit to read a wireless sensing module having RFID transponder communications circuits, an RF transceiver for communicating with a home base, and a coil for transmitting power to a wireless sensing module.

Mobile charge monitoring line 36 to processor 38 is used to optimize the position of charging unit 40 on robot 20. Preferably a minimal amount of power is retained in battery 24 so wireless sensor module 22 can operate and its processor 38 can help robot 20 position its charging unit 40. When current is below a minimum the wireless sensor module asks charging unit 40 to move to optimize its position. If totally depleted wireless sensor module 22 could only do that if charging unit 40 on unmanned vehicle 22 is providing enough power to start circuitry 42 on wireless sensor module 22. Wireless sensor module 22 can look at amplitude of current or at spacial derivative to know which direction to move. Positioning can also be accomplished by using the received signal strength from RF transmitter 50. This can be used to help robot 20 find wireless sensor module 22 for coarse positioning. Then, charging circuit monitoring line 36 could be used to more finely tune position of robot's coil 52 (FIG. 4).

Figure 3:
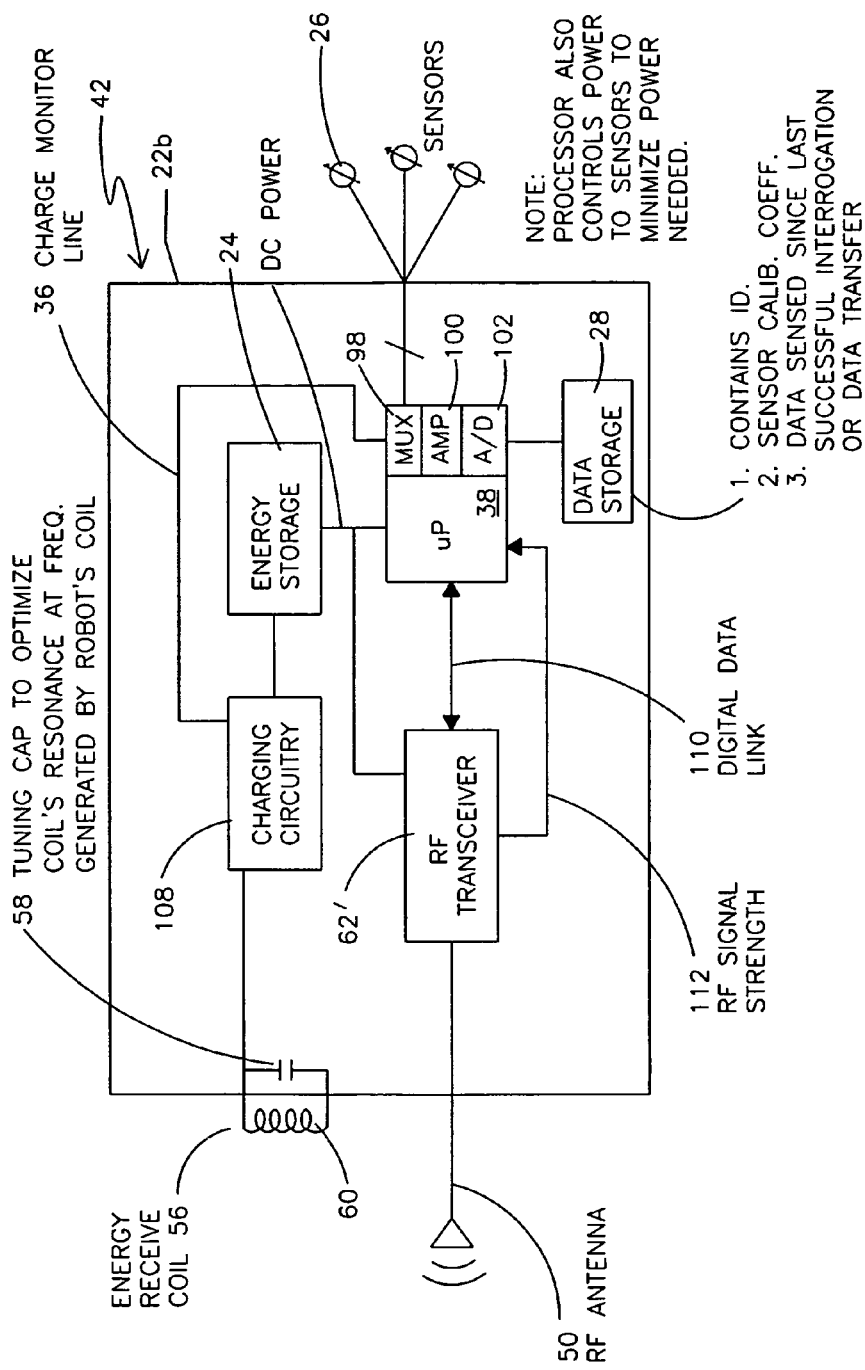
FIG. 3 is a block diagram of a second embodiment of a wireless sensing module having a rechargeable on-board power supply.

Charge receive circuit 54 on wireless sensing module 22 has tunable tank circuit 56 with tuning capacitor 58, as shown in FIG. 3, to optimize resonance of wireless sensing module coil 60 at the frequency generated by coil 52 on robot 20. This can be a fixed frequency. However, it may be desirable to be able to adjust the frequency for exciting and charging depending on the medium through which radiation is being transmitted. For air, high frequencies can be used, such as 200 kHz to 13.5 MHz. For transmitting through metals it is desirable to keep the frequency between 2 kHz and 20 kHz, as described in the 1024-041 application. One can adjust resonance of coil 60 from 2 kHz to 200 kHz by changing the value of tuning capacitor 58.

By nature, radio frequency (RF) transmitters 62 or transceivers 62' tend to be power consumptive. The present invention does not necessarily need RF transmitter 62 or an RF oscillator for communication. By reducing the power for communication, the distance between wireless sensing module 22 and a receiver on robot 20 can be increased. If robot 20 is providing the power for RF transmitter 62 or transceiver 62' it has to be close enough to both provide enough power to start up processor 38 on wireless sensor module 22 and to provide power to operate transmitter 62, 62'. If RF transmitter 62, 62' is eliminated then less power is used and the distance can be increased. One way to accomplish this is to replace RF transmitter 62, 62' with radio frequency identification (RFID) transponder tag 66, such as is available from Microchip Technologies (Chandler, Ariz.). Use of RFID requires that robot 20 must be located close to a transponder 68 on robot 20 but not be as close as would be required if an RF transmitter were used at wireless sensor module 22. The biggest disadvantage of both techniques is that information is transmitted only when robot 20 is close if the wireless sensor module has no on board power supply.

With the oscillator for RF transmitter 62, 62' in the circuit of wireless sensor module 22 and with on board power source 24, the transmission of data can be over a greater distance. When charging with robot 20 it is best to turn off or put wireless sensor module 22. Alternatively wireless sensor module 22 can be put into sleep mode to draw minimal power while charging.

In addition to communication between single unmanned vehicle 20 and wireless sensing module 22, there can be many unmanned vehicles 20, and they can also communicate with each other. In addition to charging wireless sensing modules 22, unmanned vehicles 20 can also charge each other. Similarly, wireless sensing modules 22 can talk to each other, to unmanned vehicles 20, to a base station (not shown), or to a remote receiver (not shown), such as a satellite. Communication from wireless sensing module 22 depends largely on power available at wireless sensing module 22, and the present invention solves this power problem by using a mobile recharging technique.

Wireless sensor modules 22 can be miniaturized by using tiny on board rechargeable power supply 70 including charging circuitry 72 and energy storage 24. Energy storage 24 is charged or recharged by recharging robot 20. For example for wireless sensing modules embedded in a structure in a space vehicle, many wires extending from each of the wireless sensing modules to a solar panel can be avoided by providing small battery or capacitor 24 with each wireless sensing module 22. Robot 20 is provided that includes larger battery 74 that may be recharged using the solar panel. Robot 20' travels to each wireless sensing module 22 and charges each of the smaller batteries or capacitors 24. Robot 20 can also interrogate wireless sensing modules 22 and obtain sensor data and module ID data.

As an alternative, in applications where batteries are undesirable, robot 20 can provide power to wireless sensing modules 22 and interrogate wireless sensing modules 22 that may be embedded in a structure. Data, including identification, sensor calibration and type, and sensor data may be stored on robot 20. These data can also be transmitted directly from robot 20 as it is received.

Energy to run wireless sensing module 22 or a network of wireless sensing modules 22 can also be taken directly from the environment in some situations. In one embodiment each wireless sensing module 22 in a network has a power source that may be a battery or may be one that takes energy from the environment. Copending patent application 115-008, incorporated herein by reference, filed on the same day as this application, more fully describes a system for harvesting energy from the environment. Each wireless sensing module remains in sleep mode to conserve power. Wireless sensing module 22 wakes up periodically to determines whether a robot is near by checking for its transmitted signal. Little power is needed for this check. If robot 20 is close then wireless sensing module 22 will transmit to robot 20. The transmission can be periodic to avoid collisions with transmissions from other wireless sensing modules. Periodic transmission would include a randomization timer that allows time division multiple access (TDMA) from multiple wireless sensing modules on the network. Wireless sensing module 22 may initially be in sleep mode, as shown in step 80 of FIG. 1. It wakes up after a preprogrammed time period, as shown in step 82. Its receiver is switched on to listening mode, as shown in step 84. As shown in step 86, if it detects a unique code from a robot it can transmit data, as shown in step 88 through antenna 90 at a time interval set by randomization timer 92 for collision avoidance. If no signal is detected from a robot, wireless sensing module 22 goes back to sleep, as shown in step 94.

Randomization timer 92 is provided to allow networks of wireless sensor modules 22 to transmit on the same RF channel with a statistically small percentage of RF collisions between wireless sensor module transmissions on the network. The advantage is that transceiver or receiver 100 on robot 20 need only receive signals on one RF channel, allowing it to be smaller and lower in power consumption than a receiver designed to handle many RF frequencies. A system for data collection and internet distribution of data from receiver 100 designed to operate with a network of wireless sensing modules 22 using these TDMA techniques is provided in FIGS. 7-11 and described herein below.

Battery 24 on wireless sensing module 22 can be charged wirelessly by robot 20 using electromagnetic radiation from robot 20 to wireless sensing module 22. Once recharged wireless sensing module 22 can send data periodically without robot 20 having to be nearby. Wireless sensing module 22 has either a battery or capacitor 24 to store energy received wirelessly from robot 20. Wireless sensing module 22 can use that energy to transmit a long distance without robot 20 having to visit. For example, small thin rechargeable batteries capable of infinite recharge cycles would provide the ability to transmit a shorter distance multiple times or a longer distance fewer times. Such a battery could transmit 20 miles if the transmission is only once a year or if larger batteries are provided it could transmit more frequently. Or it could transmit 20 feet many times. For example, a 20 mW transmitter can transmit about ⅓ mile and using a lithium ion AA battery which provides about 1000 mA hours on one charge. A transmitter operating at 3V dc and consuming 10 mA would consume 30 mW of power while transmitting. This system would be able to transmit for 33 hours continuously on the lithium ion battery. Such a battery allows lengthening time between robot visits. An advantage of the battery is that the system can be active and can sample and log data from sensors using stored energy so more information can be included in the later transmission.

Having a power source at each wireless sensing module 22 such as rechargeable battery or storage capacitor 24 is a big advantage over a system that can only transmit when robot 20 is near. Without a local power source, wireless sensing module 22 can only transmit in real time and data is missed when robot 20 is away. Acquiring and logging data from sensors 26 consumes one tenth as much power as is used transmitting data from sensors 26. So when acquiring and logging data battery 24 can last much longer, over 300 hours using the same lithium ion battery.

Wireless sensing module 22 can also transmit when there is an event. Wireless sensing module 22 can transmit the information that it needs its battery recharged, that there is a problem sensed at one or more wireless sensing modules 22, that it has updated data, or that all is OK, and it does not need another charge for another 20 days. Robot 20 can have a camera (not shown) as one of its sensors to give it visual inspection capability. In addition to use for powering or communicating with wireless sensing modules 22, unmanned vehicle 20 of the present invention can also be used to provide power and communicate with actuators, such as a relay, solenoid, piezoelectric or shaped memory alloy.

Rechargeable battery 24, such as a lithium ion battery, a capacitor, or a fuel cell can be used on wireless sensing module 22. Super capacitors are very efficient large capacitors in small packages.

For underwater applications a robot interrogator can also be used but it would require close proximity due to RF attenuation in water. For example, one underwater application would be a robot 20 to interrogate a network of wireless sensing modules 22 designed to measure strain and permanent deformation of welds of an off shore oil pipeline (not shown). In this case robot 20 gets close to each wireless sensing module 22 as it moves up and down the pipe line.

Preferably, each wireless sensing module 22 in a wireless sensing module network has a 16 bit identification code so robot 20 can tell which wireless sensing module 22 it is near and also tell its physical location. Physical location of wireless sensing module 22 can be used by robot 20 to help it determine direction and distance to the next wireless sensing module 22. Preferably robot 20 would carry an orientation sensing module such as described in Ser. No. 09/457,493, filed Dec. 8, 1999, incorporated herein by reference.

Robot 20 can be autonomous, semi-autonomous, or it can be remote controlled. An autonomous robot may be programmed to follow a preset path. Preferably robot 20 would include light, magnetic, or touch sensors for providing feedback to follow a marked path. The marked path could be a painted stripe, a series of magnets, or a series of bumps.

Under remote control robot 20 may be directed in real time. It can also be directed by instructions from wireless sensing modules 22. Robot 20 can contain a navigation system. A component of that navigation system can include a solid state orientation sensor, as described in copending U.S. patent application Ser. No. 09/457,493, filed Dec. 8, 1999, incorporated herein by reference.

Figure 2:
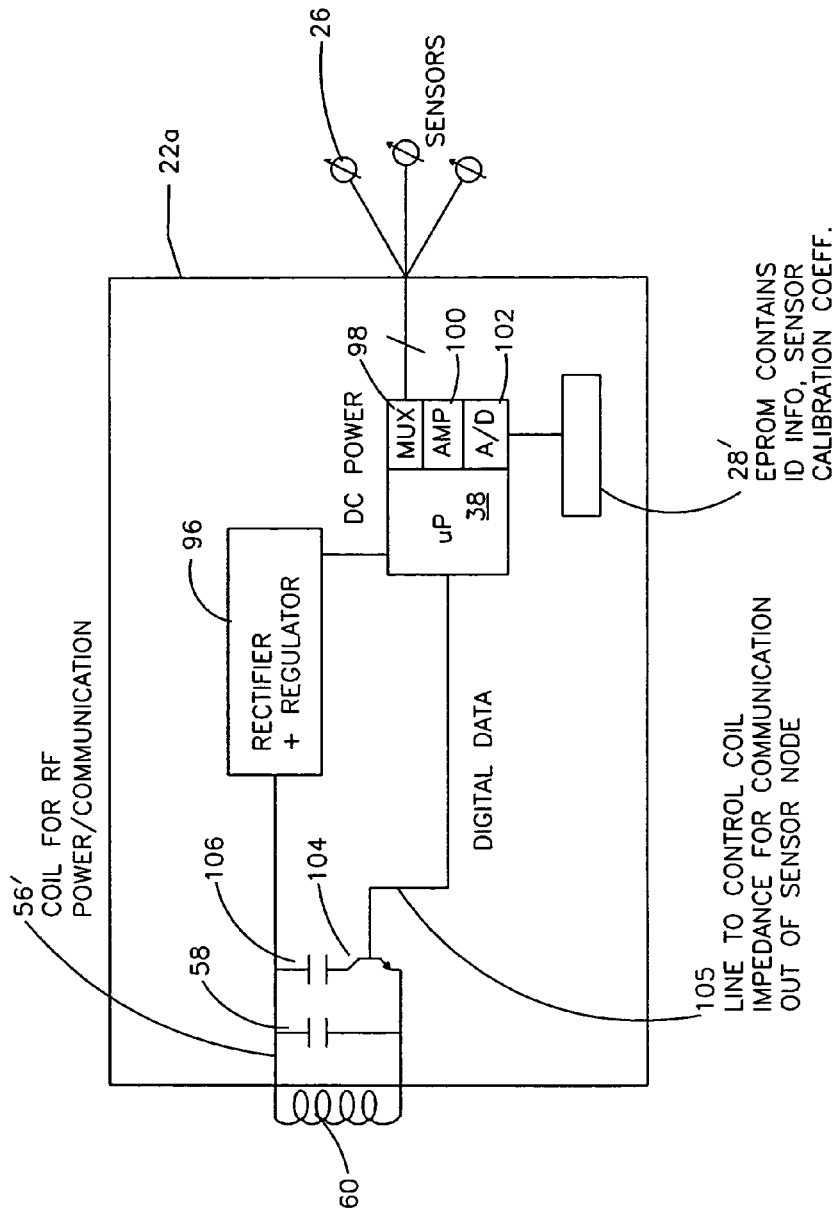
FIG. 2 is a block diagram of a first embodiment of a wireless sensing module having no on-board power supply.

FIGS. 2 and 3 show block diagrams of two embodiments of wireless sensing modules 22a, 22b. FIG. 2 shows the embodiment that has no battery or other energy storage device and is externally powered. Electromagnetic transmission from an unmanned vehicle is received at LC tank circuit 56' including coil 60 and capacitor 58. This ac signal is rectified and regulated in rectifier and regulator circuit 96, to provide dc power for running microprocessor 38, multiplexor 98, amplifier 100, a/d converter 102, non-volatile memory 28', and sensors 26.

Non-volatile memory 28' contains an identification address, sensor calibration coefficients, and data from sensors 26 collected since the previous successful interrogation or data transfer. Processor 38 also controls power to sensors to minimize power used by the sensors.

Digital data is communicated from various sensors 26 by digitally varying the reactance of tank circuit 56 used to receive power by wireless sensing module 22a. This is accomplished by providing the signal along coil impedance control line 105 from microprocessor 38 to transistor switch 104 that inserts small capacitor 106 in and out of tank circuit 56', as shown in FIG. 2. Coil impedance control line 105 controls the state of transistor switch 104 which controls whether capacitor 106 is in circuit 56', and the impedance of this circuit can be detected by the reader on robot 20.

FIG. 3 shows the embodiment of wireless sensing module 22b that has an on board rechargeable energy storage device, such as a battery or capacitor 24. For recharging, electromagnetic transmission from unmanned vehicle 20 is received at LC tank circuit 56 including coil 60 and capacitor 58. This ac signal is rectified and regulated in charging circuitry 108 to provide dc power for charging energy storage device 24. Microprocessor 38, multiplexer 98, amplifier 100, a/d converter 102, data storage device 28, 28', RF transceiver 62', and charging circuitry 108 are all powered from energy storage device 24. Processor 38 may control power to sensors 26 to minimize power drawn by wireless sensing module 22b. Data from various sensors 26 are converted to digital form and directed from microprocessor 38 to RF transceiver 62' along digital data line 110 for transmission from RF antenna 50. Data or instructions can also be received by wireless sensing module 22b and the data transferred from RF transceiver 62' to microprocessor 38. Data storage device 28 can be non-volatile memory and it may store an identification code, sensor calibration coefficients, data from the sensors that was stored since the last successful interrogation or data transfer, and the data received from transceiver 62'. Wireless sensing module 22 can have charge monitoring line 36 to sense how well coupled wireless sensing module 22 is with the power transmitting source, such as unmanned vehicle 20. It can also have RF signal strength line 112 that also senses how well coupled (electromagnetically) wireless sensing module 22 is with unmanned vehicle 20. Charge monitoring line 36 and RF signal strength line 112 can both be used to help direct unmanned vehicle 20 to find or more closely approach wireless sensing module 22. Unmanned vehicle 20 would be directed to move in the direction of larger signal amplitude signal. The RF signal on RF signal strength line 112 may be used at larger distances and the charge monitoring signal on charge monitoring line 36 at closer distances.

Figure 5:
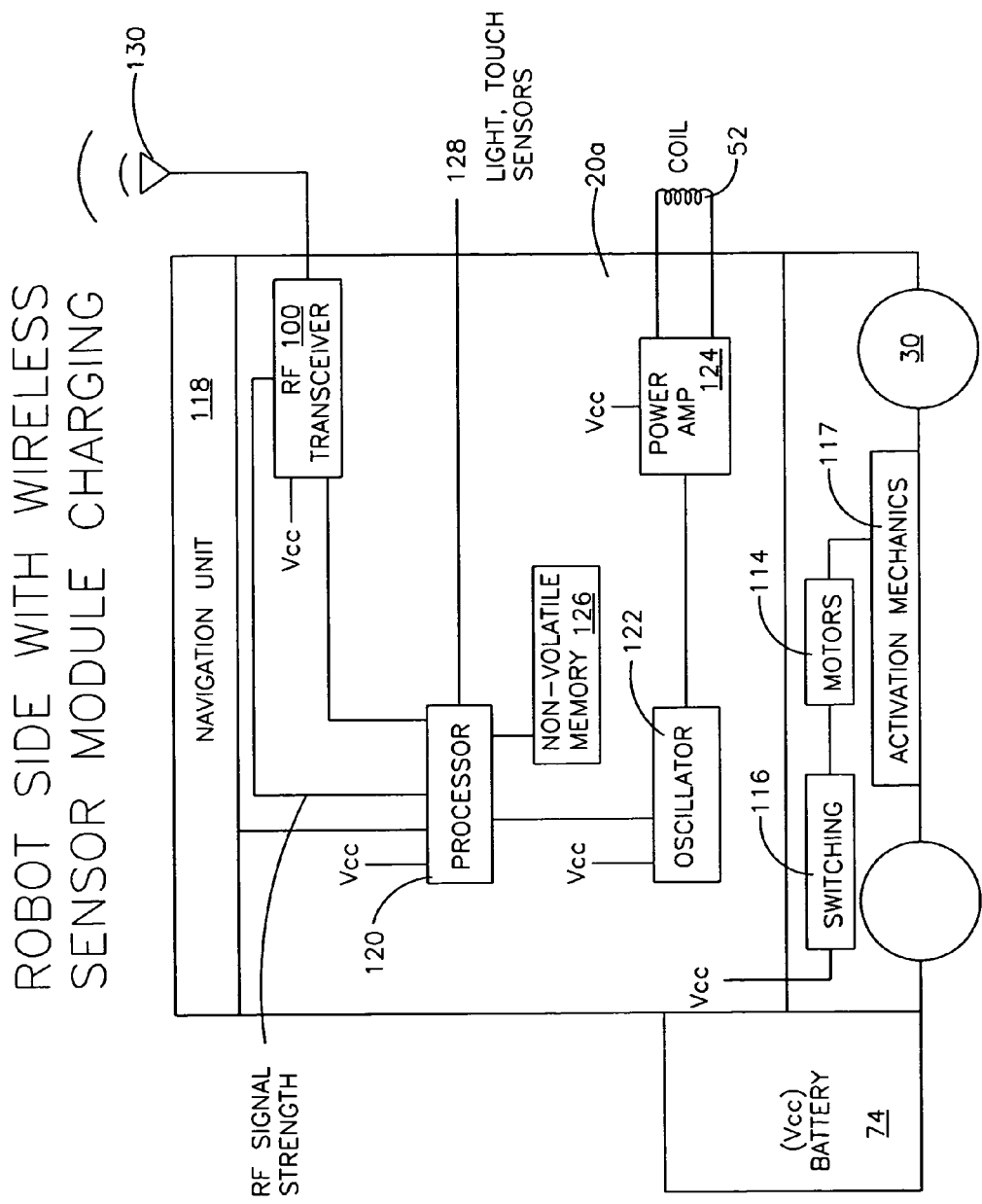
FIG. 5 is a block diagram of an unmanned vehicle similar to FIG. 4 but without the RFID transponder and having a circuit to recharge a battery or capacitor on a wireless sensing module.

FIGS. 4 and 5 show block diagrams of two embodiments of unmanned vehicle or robot 20. FIG. 4 shows the embodiment of an unmanned rolling vehicle that has no charging circuit and FIG. 5 shows the embodiment as modified to provide for unmanned vehicle 20a, 20b being used to wirelessly charge battery or capacitor 24 on wireless sensing module 22. In both embodiments, battery 74 on unmanned vehicle 20a, 20b provides power to run its circuitry, its RF transmissions and RF receptions, and to provide power for its motors 114 for locomotion. Motors 114 are controlled by switching electronics 116 and are connected to activation mechanics 117. Navigation unit 118 can be provided for assisting it in determining its location and the location of wireless sensing modules 22. Microprocessor 120 controls oscillator 122 for providing transmissions at coil 52 for powering wireless sensing module 22 (FIGS. 4 and 5) or for recharging battery or capacitor 24 on wireless sensing module 22 (FIG. 5). Microprocessor 126 receives input from light and touch sensors 128. Output of oscillator 122 is amplified by power amplifier 124. Data may also be transmitted or received by RF transceiver 100 through antenna 130 with the data coming from or stored in non-volatile memory 126 on board unmanned vehicle 20a, 20b. In FIG. 4 RFID transponder reading circuit 132, such as available from Microchip Technologies Corp, may be used in order to read data encoded by wireless sensing module 22 having switched reactance as shown in FIG. 2. In FIG. 5 the RFID reader can be eliminated if wireless sensing modules having switched reactance, as shown in FIG. 2, do not need to be interrogated.

Figure 6:
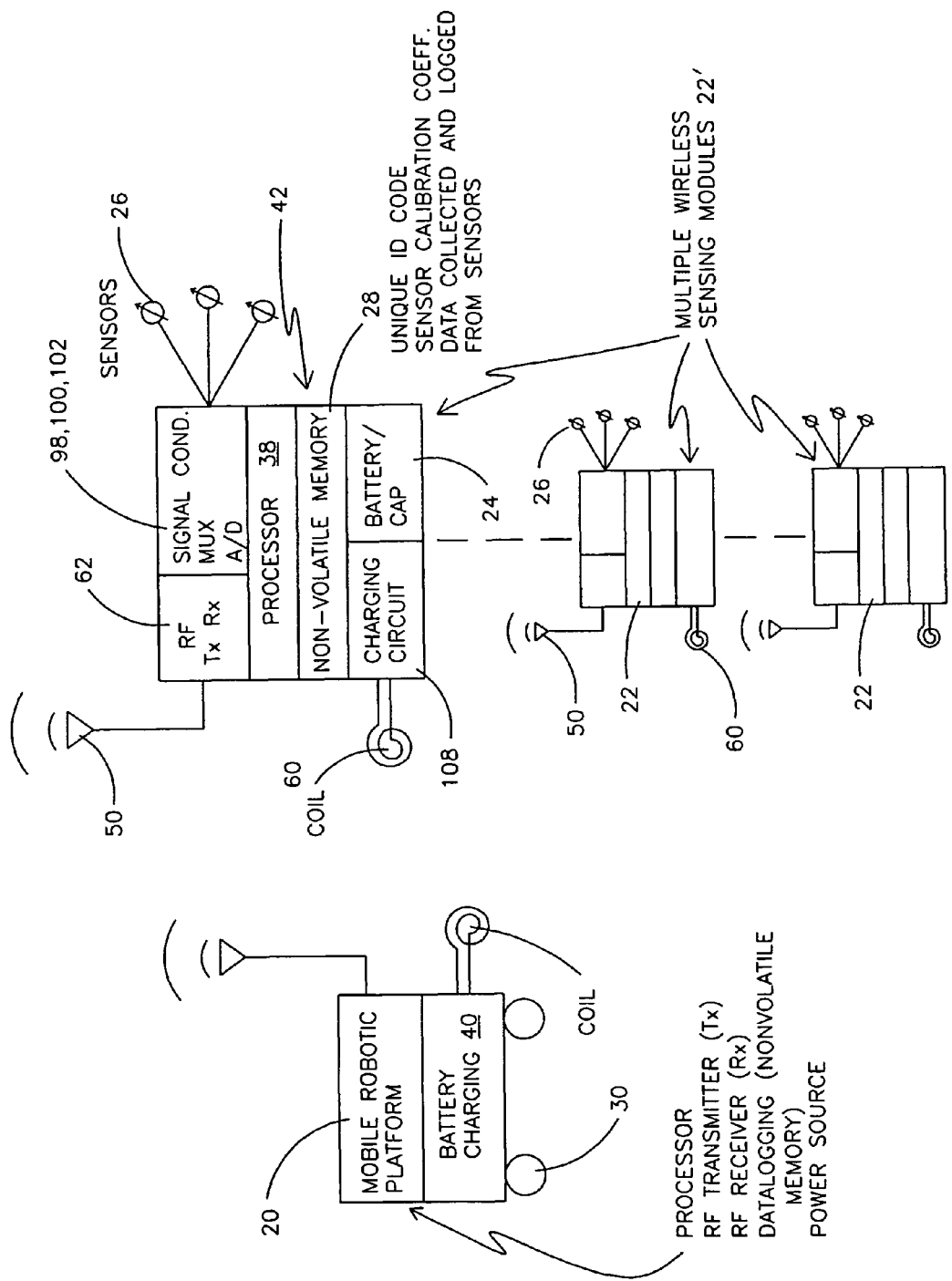
FIG. 6 is a block diagram of a first embodiment of a unmanned vehicle and a network of wireless sensing modules each with rechargeable power supplies capable of being recharged by the unmanned vehicle.

FIG. 6 shows the system with network of wireless sensing modules 22' having rechargeable power supplies 24 that are served by unmanned vehicle 20.

FIG. 7 shows the system with a network of wireless sensing modules 22" having power supplies 24 that are served by unmanned vehicle 20 but unmanned vehicle 20 gets close enough to collect data but does not have to recharge power supplies 24' on wireless sensing modules 22. This would be advantageous where energy can be harvested from the environment, such as with solar cells, piezoelectric vibration transducers, and inductive transformers located near power lines. A manned or unmanned platform can be used. A platform that is either stationary or mobile can also be used.

Figure 8:
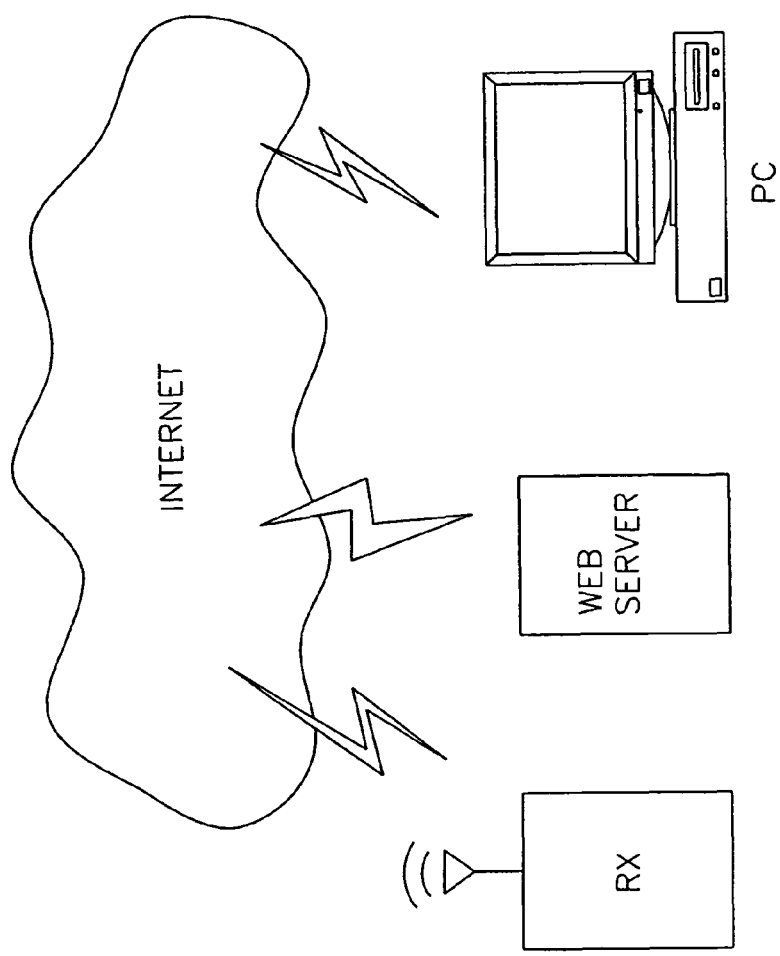
FIG. 8 is a block diagram showing a scalable wireless web sensor network.
Figure 8:
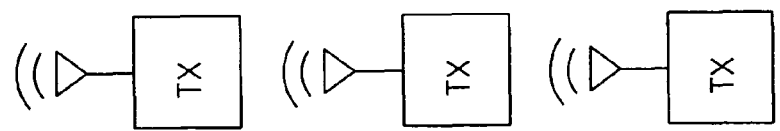

The scalable wireless web sensor networks employ transmitters with direct sensor inputs and receivers, employing time division multiple access (TDMA) techniques, and multiple transmitters that (each with a unique address) can communicate digital data to a single receiver, as shown in FIG. 8.

The wireless web sensor networks are scalable and can collect data from up to 1,000 sensors via a single receiver. The receiver is Ethernet enabled and acts as a web server, thereby providing the user with data via a browser or an XML application.

The performance of the network is applicable for structural, agricultural, environmental, military and industrial applications. This system can collect data from hundreds of transmitters, and by utilizing this web-based system allow the information to be shared with an unlimited number of users.

The receiver uses narrowband RF communications at 418 MHz. A functional block diagram of the system is provided in FIG. 8.

Each transmitter Tx includes sensor signal conditioning, multiplexer, 16 bit A/D converter, microprocessor, and RF link, as shown in FIGS. 6 and 7. The transmitters are compatible with a wide variety of sensors, including thermocouples (cold junction compensated), strain gauges, load cells, torque transducers, and displacement transducers (DVRT's).

Figure 1:
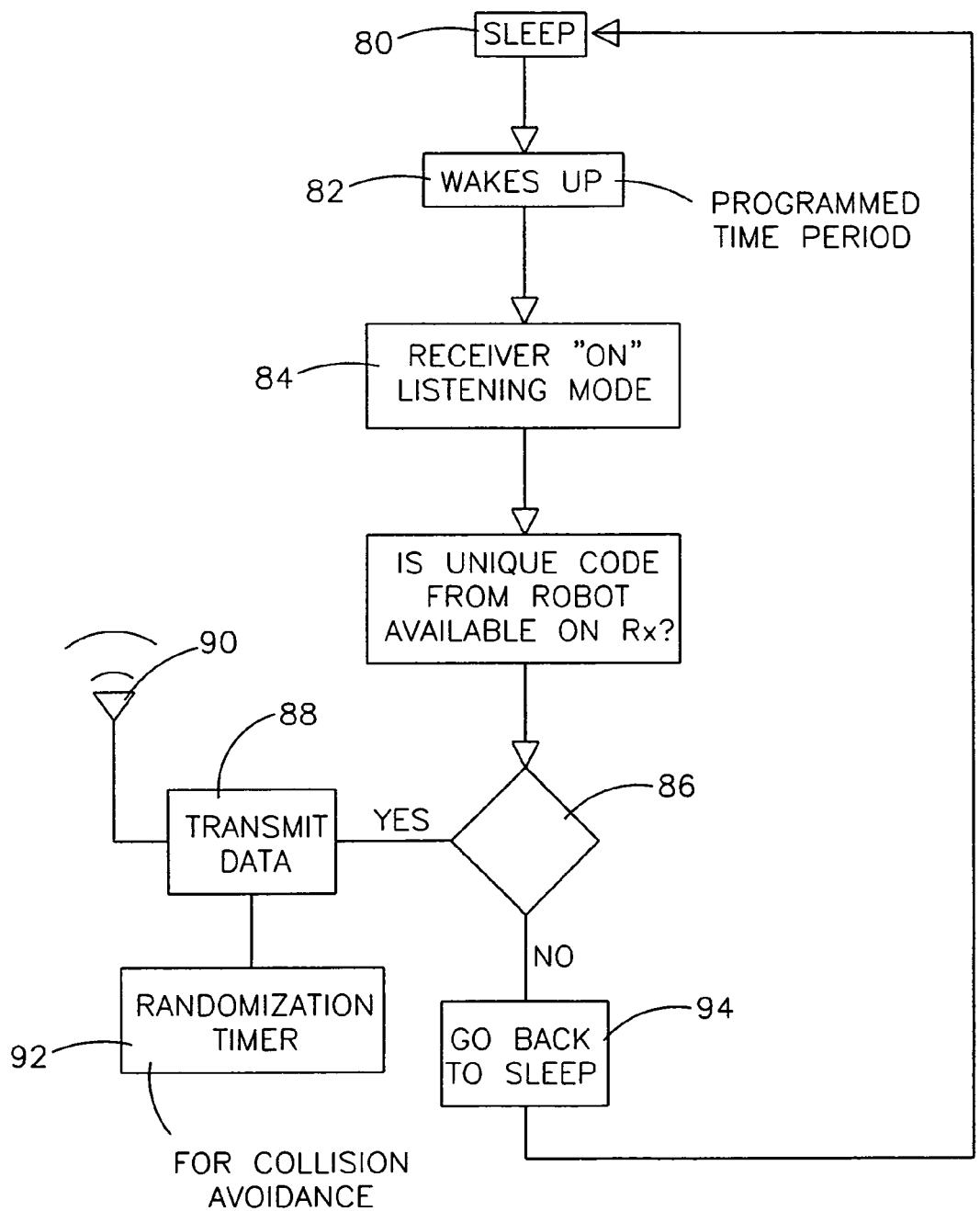
FIG. 1 is a flow chart of judicious use of power on a wireless sensing module which is kept in sleep mode until it receives a signal that it should transmit.

A sleep timer with random wake-up, as shown in FIG. 1, allows multiple periodic transmitters to operate on the same communications channel with a very low collision probability. At update rates of 30 minutes from each transmitter, up to 1000 remote transmitters can communicate to a single RF receiver.

The receiver includes a single board computer, available, for example, from Rabbit Semiconductor, with Ethernet capability, built in XML and HTML (internet enabled) file transfer protocols, data storage capability (10 Megabytes) and a web server. The receiver detects data from a specific address on the network of sensors and transmitters, and logs the information in its non-volatile memory. Receiver Rx, shown in FIG. 8, includes microcontroller 38 (FIGS. 6 and 7) that performs error checking of the RF signal, and outputs a serial (RS-232) data stream to the single board computer. The single board computer and the IP address can be programmed to provide data output in extensible markup language (xml) data format. Receiver Rx can be a mobile robot, as described herein above or it can be located on a operator controlled vehicle or hand-carried platform or it can be located on a fixed platform.

The receiver can recognize inputs from an "ad hoc" network of transmitters, and record data from this network over time, along with calibration data unique to each sensor. Depending on the sensor being employed, a transmitter can support up to 5 separate sensors (channels).

The web server interrogates the single board computer from a standard web browser (MicroSoft's Internet Explorer or Netscape's Navigator) to receive multi-channel sensor data from the Single board computer in XML format. The date and time are maintained on the Single board computer with battery backup and may be re-programmed or data can be calibrated via the Internet. Data is displayed over time on a continuously running strip chart within the Internet browser's window.

An advantage of XML format is that it can be opened by any conventional internet browser.

Figure 9:
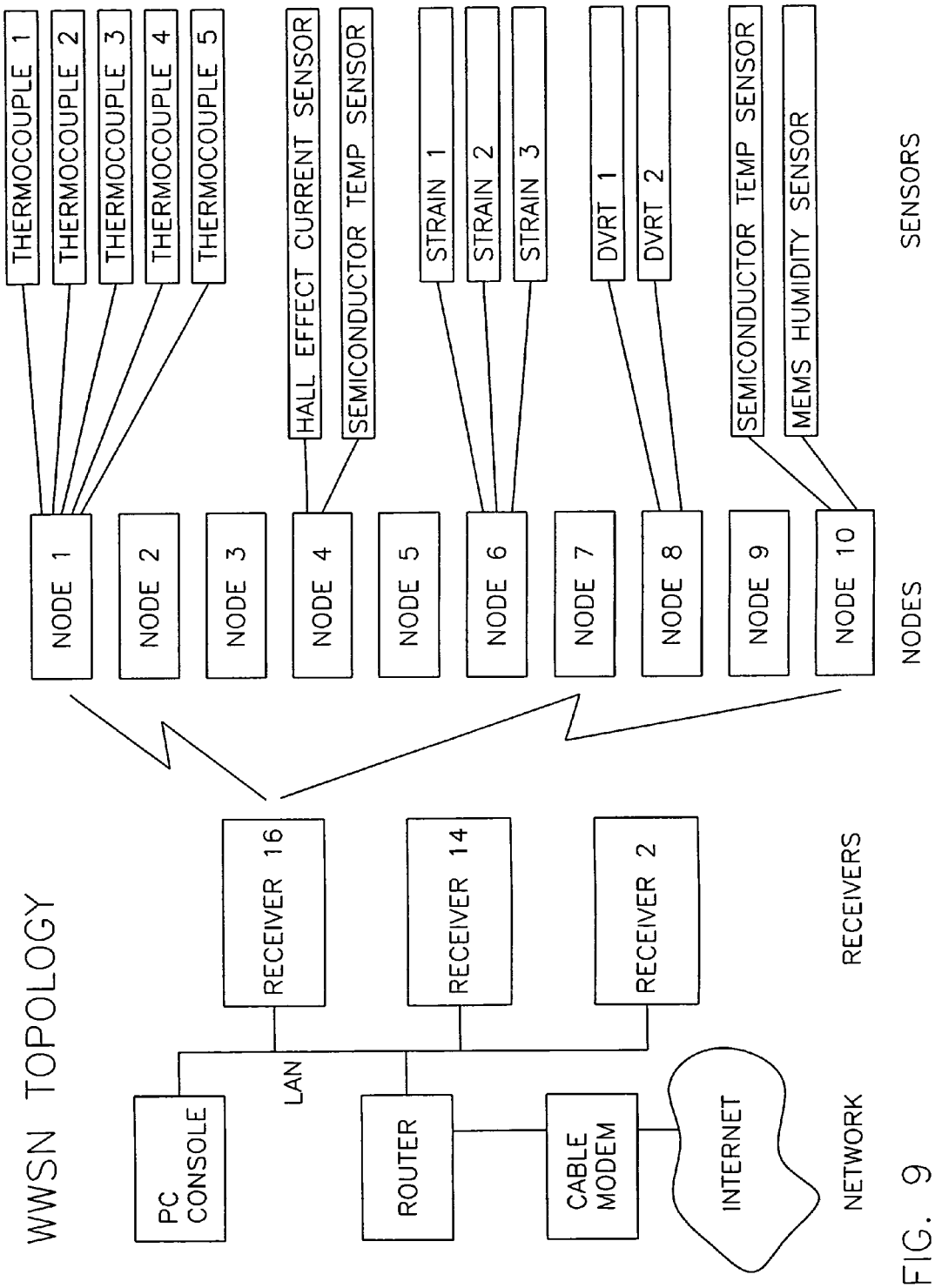
FIG. 9 is a block with more details of the scalable wireless web sensor network of FIG. 8, including sensors, receivers, LAN, PC console, router, cable modem and internet.
Figure 10:
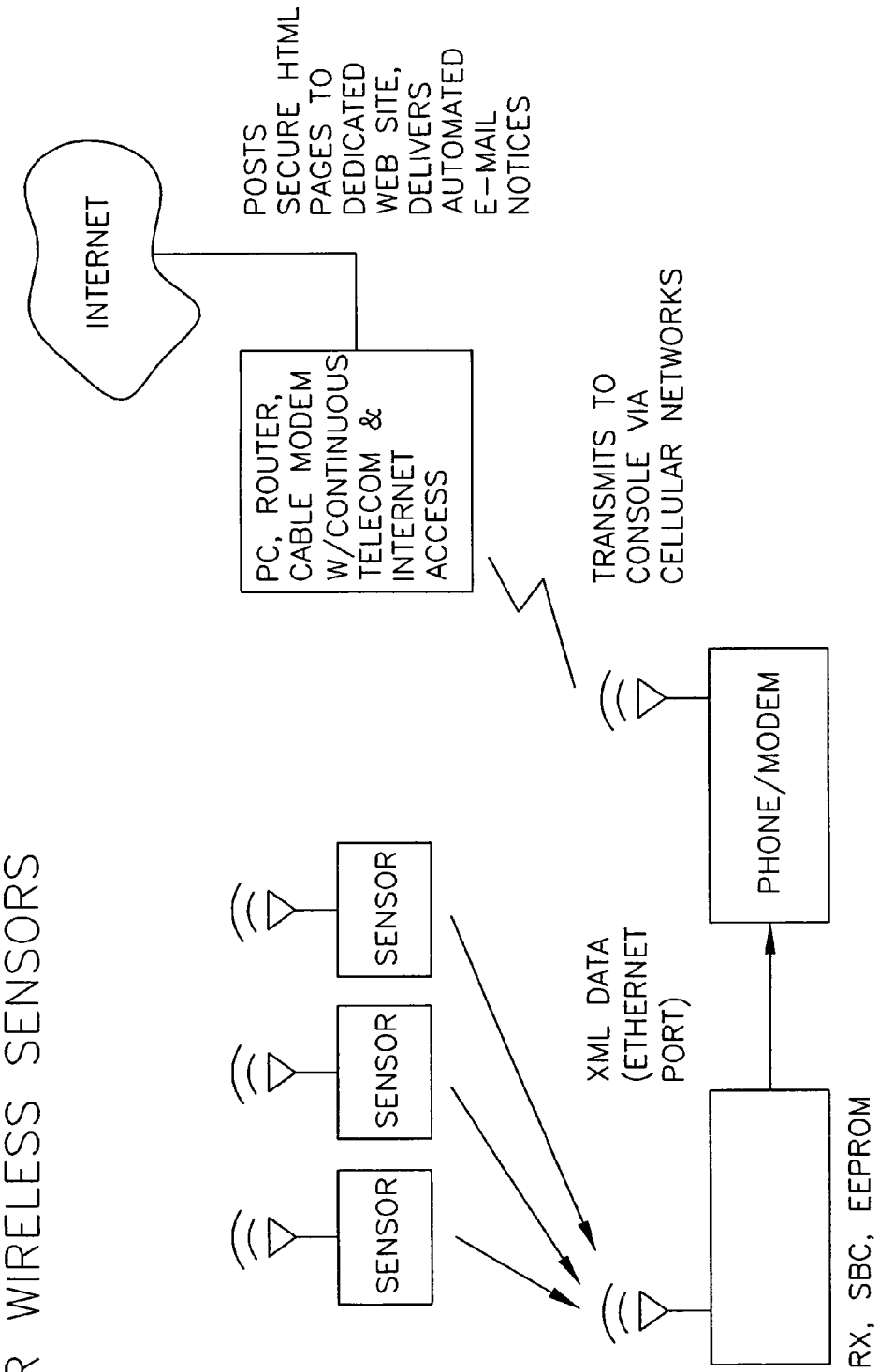
FIG. 10 is a block diagram showing a double scalable wireless web sensor network in which data from sensors is wirelessly transmitted to a receiver that then wirelessly transmits to a PC console connected to the internet.
Figure 11:
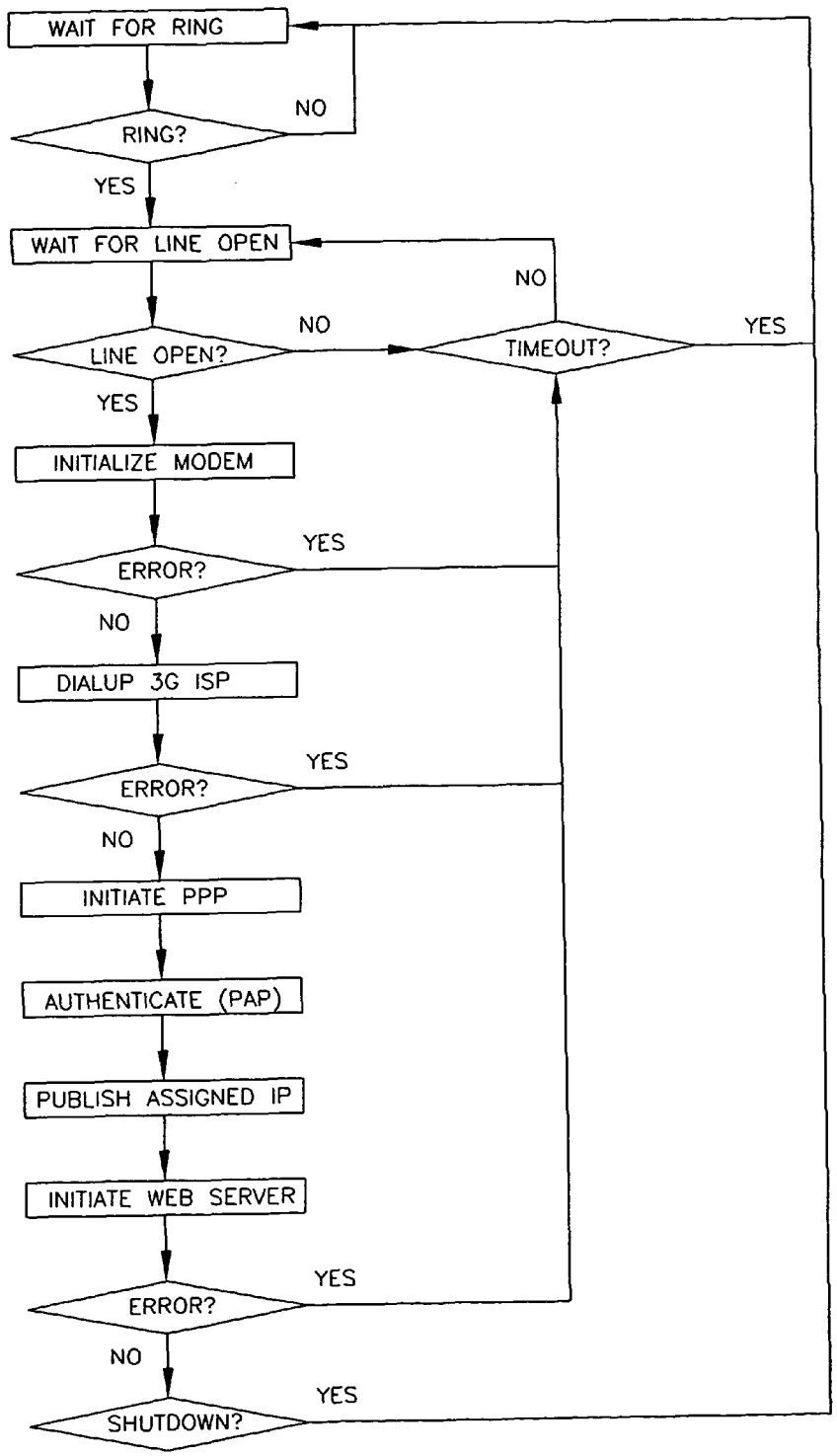
FIG. 11 is a flow chart showing user-initiated remote data acquisition.

Connection for multiple receivers on a LAN and connection of the LAN to a cable modem that connects to a PC console and to the internet through a router and cable modem is shown in FIG. 9. In this configuration PC console reads data on LAN from receivers and sends it through router and cable to internet. Alternatively instead of an ethernet LAN, a cellular phone can be used to send the XML data from receivers to a PC console that then sends the data through the cable modem to the internet, as shown in FIG. 10.

Data transmission can be scheduled, event triggered, or user initiated. Scheduled is the simplest internet communications mode. We have tested firmware that initiates a wireless modem connection via a Kyocera 2235 cell phone, establishes an FTP connection, and uploads data from the base station receiver. With the real-time clock of the RCM2200, data can be delivered on an absolute schedule (for example, upload at 5 PM every day), or on a regular interval (upload every 48 hours).

In event-triggered mode, the base station can initiate the uplink process if the collected data is outside of user-defined critical thresholds. User-Initiated mode is especially helpful during system installation, modification, and demonstration. As described in the flowchart in FIG. 11, CPU is kept in a low power state, monitoring the status of the "RING" line of the wireless modem. If a user dials the number of the wireless modem, the RING line is activated, the CPU recognizes the event, and initiates a modem connection once the line is open. After the modem connection is established with the ISP, the base station can either upload data, or bring up a web server for the user to access. All three modes can be provided in firmware.

To avoid power drain the wireless modem could be turned on in scheduled windows of time. Hardware with substantially reduced standby power requirement can also be used. For example wireless modem SB555, requires only 1 to 2 mA of standby current.

Thus, the receivers are hard wired or wireless internet appliances capable of operating as nodes on an Ethernet LAN. Examples of wireless communications standards compatible with these receivers include 802.11b (WIFI) and Bluetooth.

The system can include a docking station. The unmanned vehicle is able to connect to the docking station for recharging unmanned vehicle batteries or for transferring data to or from the unmanned vehicle.

While several embodiments of the invention, together with modifications thereof, have been described in detail herein and illustrated in the accompanying drawings, it will be evident that various further modifications are possible without departing from the scope of the invention. Nothing in the above specification is intended to limit the invention more narrowly than the appended claims. The examples given are intended only to be illustrative rather than exclusive.

What is claimed is:

1. A sensing system, comprising an unmanned vehicle and a wireless sensing module, wherein said unmanned vehicle is for approaching said wireless sensing module, wherein said unmanned vehicle is for wirelessly electromagnetically powering said wireless sensing module, wherein said wireless sensing module comprises a sensor, a data logging unit, an energy storage device, and a communications circuit, wherein said data logging unit is connected for storing information derived from said sensor, wherein said data logging unit is connected to receive energy from said energy storage device for recording data from said sensor when said unmanned vehicle is not powering said wireless sensing module, wherein said communications circuit is connected for communicating data derived from said information stored in said data logging unit, wherein said unmanned vehicle includes an unmanned vehicle charging circuit, wherein said unmanned vehicle charging circuit is for transmitting electromagnetic radiation to said wireless sensing module for charging or recharging said energy storage device on said wireless sensing module.

2. A system as recited in claim 1, wherein said energy storage device comprises at least one from the group consisting of a battery, a capacitor, and a fuel cell.

3. A system as recited in claim 1, wherein said communications circuit is for communicating with said unmanned vehicle.

4. A system as recited in claim 1, wherein said wireless sensing module further comprises an actuator.

5. A system as recited in claim 1, wherein said wireless sensing module further comprises a microprocessor.

6. A system as recited in claim 5, wherein said wireless sensing module further comprises a multiplexor, a signal conditioner, and an a/d converter.

7. A system as recited in claim 5, wherein said data logging unit includes a non-volatile memory.

8. A system as recited in claim 1, wherein said wireless sensing module comprises a microprocessor, a non-volatile memory, a signal conditioner, an a/d converter, and a communications circuit, wherein said sensor is connected to said microprocessor through said signal conditioner and said a/d converter, and wherein said microprocessor is connected to said non-volatile memory and to said communications circuit.

9. A system as recited in claim 1, wherein said wireless sensing module further comprises a power receiving circuit for wirelessly receiving power from said unmanned vehicle.

10. A system as recited in claim 9, wherein said wireless power receiving circuit includes a rectifier and regulator.

11. A system as recited in claim 9, wherein said wireless power receiving circuit includes a coil and a capacitor.

12. A system as recited in claim 11, wherein said capacitor comprises a tunable capacitor.

13. A system as recited in claim 11, wherein said wireless power receiving circuit is also used for transmitting digital data between said unmanned vehicle and said wireless sensing module.

14. A system as recited in claim 13, wherein said wireless sensing module further comprises an element to vary reactance of said wireless power receiving circuit.

15. A system as recited in claim 14, wherein said element to vary reactance of said wireless power receiving circuit is controlled by data derived from said sensor.

16. A system as recited in claim 15, wherein said unmanned vehicle further comprises a circuit for detecting said variation in reactance.

17. A system as recited in claim 1, wherein said wireless sensing module further comprises a transmitter for transmitting information derived from said sensor.

18. A system as recited in claim 1, wherein said unmanned vehicle charging circuit includes a coil for transmitting said electromagnetic radiation.

19. A system as recited in claim 1, wherein said unmanned vehicle charging circuit is not physically connected to another source of power while charging or recharging said energy storage device on said wireless sensing module.

20. A system as recited in claim 19, wherein said unmanned vehicle charging circuit comprises a rechargeable battery.

21. A system as recited in claim 19, wherein said unmanned vehicle charging circuit comprises at least one from the group consisting of a capacitor, a solar cell, a fuel cell, and a generator.

22. A system as recited in claim 1, wherein said unmanned vehicle comprises a processor.

23. A system as recited in claim 22, wherein said processor on said unmanned vehicle is for directing movement of said unmanned vehicle.

24. A system as recited in claim 22, wherein said wireless sensing module includes a memory for storing an address, and wherein said processor on said unmanned vehicle is capable of identifying said wireless sensing module from said address.

25. A system as recited in claim 22, wherein said unmanned vehicle further comprises memory for storing data received from said wireless sensing module.

26. A system as recited in claim 1, further comprising a plurality of said wireless sensing modules, wherein said unmanned vehicle is capable of sequential movement to each wireless sensing module of said plurality of wireless sensing modules wherein said unmanned vehicle charging circuit is capable of sequentially charging or recharging said energy storage device on each wireless sensing module of said plurality of wireless sensing modules.

27. A system as recited in claim 1, wherein said unmanned vehicle further comprises a receiver for receiving communication from said wireless sensing module.

28. A system as recited in claim 27, wherein said unmanned vehicle further comprises an unmanned vehicle data logging unit for storing information received from said wireless sensing module.

29. A system as recited in claim 27, wherein said unmanned vehicle further comprises a transmitter.

30. A system as recited in claim 27, wherein said unmanned vehicle further comprises a coil or antenna for transmitting information to said wireless sensing module.

31. A system as recited in claim 1, wherein said wireless sensing module further comprises a device charging circuit for charging said energy storage device.

32. A system as recited in claim 31, wherein said wireless sensing module further comprises a device charging circuit monitoring line for optimizing coupling between said wireless sensing module and said unmanned vehicle charging circuit.

33. A system as recited in claim 1, wherein said unmanned vehicle includes an RF receive signal strength line for assisting said unmanned vehicle in locating said wireless sensing module.

34. A system as recited in claim 1, wherein said unmanned vehicle is at least one from the group consisting of autonomous and remote controlled.

35. A system as recited in claim 1, wherein said unmanned vehicle comprises a drone or a robot.

36. A system as recited in claim 1, wherein said sensor comprises at least one from the group consisting of a touch sensor, an accelerometer, an optical sensor, a magnetic sensor, and a video camera.

37. A system as recited in claim 1, wherein said wireless sensing module further comprises a docking station, wherein said unmanned vehicle is able to connect to said docking station.

38. A system as recited in claim 37, wherein said unmanned vehicle includes a battery, wherein said docking station is for recharging said unmanned vehicle battery.

39. A system for powering a separate device, comprising an unmanned vehicle and said separate device, wherein said unmanned vehicle is for approaching said separate device, wherein said unmanned vehicle includes a power source for wirelessly electromagnetically powering said separate device, wherein said separate device includes a power receiving circuit for wirelessly receiving electromagnetic power from said unmanned vehicle, wherein said power receiving circuit has a switched reactance modulation circuit, wherein said switched reactance modulation circuit is connected for communicating data from said separate device to said unmanned vehicle while said separate device is receiving power from said unmanned vehicle, wherein said power receiving circuit includes an energy storage device, wherein said unmanned vehicle includes an unmanned vehicle charging circuit, wherein said unmanned vehicle charging circuit is capable of charging or recharging said energy storage device on said separate device without physically contacting said separate device.

40. A system as recited in claim 39, wherein said energy storage device comprises at least one from the group consisting of a battery, a capacitor, and a fuel cell.

41. A system as recited in claim 39, further comprising a plurality of said separate devices, wherein said unmanned vehicle is capable of sequential movement to each separate device of said plurality of separate devices, wherein said unmanned vehicle charging circuit is capable of sequentially charging or recharging said energy storage device on each separate device of said plurality of separate devices.

42. A system as recited in claim 39, wherein said unmanned vehicle charging circuit transmits electromagnetic radiation to said separate device.

43. A system as recited in claim 42, wherein said unmanned vehicle charging circuit comprises a coil for transmitting said electromagnetic radiation.

44. A system as recited in claim 39, wherein said unmanned vehicle charging circuit is not physically connected to another source of power while charging or recharging said energy storage device on said separate device.

45. A system as recited in claim 44, wherein said unmanned vehicle charging circuit comprises a at least one from the group consisting of a rechargeable battery, a capacitor, a solar cell, a fuel cell, and a generator.

46. A system as recited in claim 1, wherein said power receiving circuit includes a rectifier and regulator.

47. A system as recited in claim 1, wherein said power receiving circuit includes a coil and a capacitor.

48. A system as recited in claim 47, wherein said capacitor comprises a tunable capacitor.

49. A system as recited in claim 1, wherein said separate device further comprises a microprocessor.

50. A system as recited in claim 49, wherein said separate device further comprises a multiplexor, a signal conditioner, and an a/d converter.

51. A system as recited in claim 1, wherein said separate device further comprises a non-volatile memory.

52. A system as recited in claim 1, wherein said separate device further comprises a sensor and wherein said switched reactance modulation circuit includes an element to vary reactance of said wireless power receiving circuit, wherein said element to vary reactance of said wireless power receiving circuit is controlled by data derived from said sensor.

53. A system as recited in claim 52, wherein said unmanned vehicle includes a circuit for detecting said variation in reactance.

54. A system as recited in claim 52, wherein said sensor comprises a touch sensor, an accelerometer, an optical sensor, a magnetic sensor, or a video camera.

55. A system as recited in claim 39, wherein said unmanned vehicle comprises a processor.

56. A system as recited in claim 55, wherein said processor on said unmanned vehicle is for directing movement of said unmanned vehicle.

57. A system as recited in claim 55, wherein said separate device includes a memory for storing an address, and wherein said processor on said unmanned vehicle is capable of reading said address.

58. A system as recited in claim 55, wherein said unmanned vehicle further comprises memory for storing data received from said separate device.

59. A system as recited in claim 39, wherein said separate device further comprises a device charging circuit for charging said energy storage device.

60. A system as recited in claim 59, wherein said separate device further comprises a device charging circuit monitoring line for optimizing coupling between said separate device and said unmanned vehicle charging circuit.

61. A system as recited in claim 39, wherein said unmanned vehicle is one from the group consisting of autonomous and remote controlled.

62. A system as recited in claim 39, wherein said unmanned vehicle comprises a drone or a robot.

63. A system as recited in claim 39, wherein said separate device further comprises a docking station, wherein said unmanned vehicle is able to connect to said docking station.

64. A system as recited in claim 63, wherein said unmanned vehicle includes a battery, wherein said docking station is for recharging said unmanned vehicle battery.

65. A sensing system, comprising an unmanned vehicle and a wireless sensing module, wherein said unmanned vehicle is for approaching said wireless sensing module, wherein said unmanned vehicle is for wirelessly electromagnetically powering said wireless sensing module, wherein said wireless sensing module comprises a sensor, a data logging unit, an energy storage device, and a communications circuit, wherein said data logging unit is connected for storing information derived from said sensor, wherein said data logging unit is connected to receive energy from said energy storage device for recording data from said sensor when said unmanned vehicle is not powering said wireless sensing module, wherein said communications circuit is connected for communicating data derived from said information stored in said data logging unit, further comprising a plurality of said wireless sensing modules, wherein said unmanned vehicle is capable of sequential movement to each wireless sensing module of said plurality of wireless sensing modules, wherein said unmanned vehicle further comprises an unmanned vehicle charging circuit, wherein said unmanned vehicle charging circuit is capable of sequentially charging or recharging said energy storage device on each wireless sensing module of said plurality of wireless sensing modules.

66. A sensing system, comprising an unmanned vehicle and a wireless sensing module, wherein said unmanned vehicle is for approaching said wireless sensing module, wherein said unmanned vehicle is for wirelessly electromagnetically powering said wireless sensing module, wherein said wireless sensing module comprises a sensor, a data logging unit, an energy storage device, and a communications circuit, wherein said data logging unit is connected for storing information derived from said sensor, wherein said data logging unit is connected to receive energy from said energy storage device for recording data from said sensor when said unmanned vehicle is not powering said wireless sensing module, wherein said communications circuit is connected for communicating data derived from said information stored in said data logging unit, wherein said wireless sensing module further comprises a device charging circuit monitoring line for optimizing coupling between said wireless sensing module and said unmanned vehicle charging circuit.

67. A sensing system, comprising an unmanned vehicle and a wireless sensing module, wherein said unmanned vehicle is for approaching said wireless sensing module, wherein said unmanned vehicle is for wirelessly electromagnetically powering said wireless sensing module, wherein said wireless sensing module comprises a sensor, a data logging unit, an energy storage device, and a communications circuit, wherein said data logging unit is connected for storing information derived from said sensor, wherein said data logging unit is connected to receive energy from said energy storage device for recording data from said sensor when said unmanned vehicle is not powering said wireless sensing module, wherein said communications circuit is connected for communicating data derived from said information stored in said data logging unit, wherein said unmanned vehicle includes an RF receive signal strength line for assisting said unmanned vehicle in locating said wireless sensing module.

68. A system for powering a separate device, comprising an unmanned vehicle and said separate device, wherein said unmanned vehicle is for approaching said separate device, wherein said unmanned vehicle includes a power source for wirelessly electromagnetically powering said separate device, wherein said separate device includes a power receiving circuit for wirelessly receiving electromagnetic power from said unmanned vehicle, wherein said power receiving circuit has a switched reactance modulation circuit, wherein said switched reactance modulation circuit is connected for communicating data from said separate device to said unmanned vehicle while said separate device is receiving power from said unmanned vehicle, wherein said separate device further comprises a device charging circuit for charging said energy storage device wherein said separate device further comprises a device charging circuit monitoring line for optimizing coupling between said separate device and said unmanned vehicle charging circuit.

* * * * *